Patented June 7, 1938

2,119,509

UNITED STATES PATENT OFFICE 2,119,509

COATED PAPER

Philip S. Barnhart, Westfield, Mass., assignor to Westfield River Paper Company, Inc., Russell, Mass., a corporation of Massachusetts No Drawing. Application June 19, 1936, Serial No. 86,082

4 Claims. (Cl. 91—68)

This invention relates to coated paper and particularly to coated paper of the type known as glassine paper.

Glassine paper as manufactured is not impervious to air or moisture and in order to impart these qualities to the paper it is necessary to coat the paper on one or both sides with a film of coating material. Moreover, a properly constituted coating composition increases the transparency of the paper.

The coating material must be so constituted that it will not detract from the transparency or flexibility of the paper and will give a glossy film that is not tacky and will be moisture-proof or moisture resistant. Obviously, these requirements materially limit the range of and proportions of the ingredients which are available.

This invention has for its salient object to provide a coated glassine paper or sheet having a coating thereon so constituted that the transparency of the sheet will be increased and the coating will be flexible, non-tacky, glossy and highly moisture resistant or moisture-proof.

Further objects of the invention will appear from the following specification.

In the composition are embodied, generally, the following ingredients, namely, a base, resin, wax and plasticizer, combined in the desired proportions.

As a base chlorinated rubber is utilized, this substance containing both tri-chloro and tetra-chloro, derivatives of rubber.

This particular type of chlorinated rubber has for its advantage the ability to give relatively high concentrations in solutions without a resultant or correspondingly high viscosity. This base, however, requires resin to give a glossy film and a plasticizer to render it soft and flexible.

For resins, a combination of resins having different properties is used and preferably a combination of glycerol abietate and para-coumarone. Glycerol abietate is made by heating glycerine and rosin to a certain temperature for a predetermined length of time. Para-coumarone resin comprises polymerized coumarone and indene. The para-coumarone is used to offset a tendency of the glycerol abietate to become tacky.

It should be understood, however, that other suitable resins may be used.

Paraffine wax having a melting point of approximately 143°–145° F. is used as the wax.

Various plasticizers may be used, such as di-butyl phthalate, di-ethyl phthalate, tri-cresyl phosphate or like substances.

The ingredients are preferably combined in the following approximate proportions, which may, however, be varied to give the desired qualities:

| | Per cent |
|---|---|
| Chlorinated rubber | 40–50 |
| Glycerol abietate | 20–25 |
| Paraffine wax, 143°–145° F. | 2–7 |
| Di-butyl phthalate | 15–21 |
| Para-coumarone, 140° C. | 5–13 |

After these ingredients are combined in these approximate proportions the composition is dissolved in any suitable hydro-carbon solvent, such as benzol, toluol, zylol, etc. to give a solution of the desired viscosity.

This solution is applied to the surface or surfaces of the sheet to be coated by roll coating or in any other suitable manner.

For instance, the glassine sheet, preferably plasticized, is humidified to increase its moisture content, if sufficient moisture is not present therein, and the surface or surfaces thereof are coated with the solution by roll coaters. The sheet is then passed through a dryer which evaporates the solvent and dries the coated surfaces.

A coating composition having the ingredients described forms a thin, glossy, highly transparent, flexible, moisture-proof or moisture resistant film. Moreover, this composition has marked advantages from the standpoint of economy. For instance, coating compositions having a nitro-cellulose base require the use of relatively high priced solvents and the concentration is limited to approximately one-half that obtainable with the chlorinated rubber base.

Although one specific embodiment and certain preferred ingredients and proportions thereof have been described, it should be understood that equivalent ingredients may be used and the proportions may be varied without departing from the spirit or scope of the invention, as defined in the following claims.

What I claim is:

1. A glassine sheet coated with a composition comprising chlorinated rubber 40–50%, resin, comprising glycerol abietate and para-coumarone, 25–38%, paraffine wax 2–7% and a plasticizer 15–21%.

2. A glassine sheet coated with a composition comprising chlorinated rubber 40–50%, resin, comprising glycerol abietate and para-coumarone, 25–38%, paraffine wax 2–7% and di-butyl phthalate 15–21%.

3. A glassine sheet coated with a composition comprising chlorinated rubber 40–50%, glycerol abietate 20–25%, para-coumarone 5–13%, paraffine wax 2–7% and a plasticizer 15–21%.

4. A glassine sheet coated with a composition comprising chlorinated rubber, resin comprising glycerol abietate and para-coumarone, paraffine wax, a plasticizer and a solvent in which the ingredients are soluble, the ingredients being combined in such proportions as to form a moisture resistant, transparent and non-tacky film upon evaporation of the solvent.

PHILIP S. BARNHART.